United States Patent [19]
Benson

[11] Patent Number: 5,427,680
[45] Date of Patent: * Jun. 27, 1995

[54] PROCESSING APPARATUS WITH WALL CONDITIONING SHUTTLE

[76] Inventor: Robert A. Benson, 13 Commonwealth Ave., Boston, Mass. 02116

[ * ] Notice: The portion of the term of this patent subsequent to Feb. 8, 2011 has been disclaimed.

[21] Appl. No.: 190,673

[22] Filed: Feb. 2, 1994

Related U.S. Application Data

[63] Continuation-in-part of Ser. No. 837,487, Feb. 18, 1992, Pat. No. 5,286,376, and a continuation-in-part of Ser. No. 997,283, Dec. 17, 1992, Pat. No. 5,284,581.

[51] Int. Cl.$^6$ .............................................. B01D 29/64
[52] U.S. Cl. ...................... 210/194; 210/355; 210/407; 210/413; 210/130; 210/136
[58] Field of Search .............. 210/194, 241, 348, 354, 210/355, 357, 396, 407, 408, 413, 117, 130, 136

[56] References Cited

U.S. PATENT DOCUMENTS

| | | | |
|---|---|---|---|
| 4,267,043 | 5/1981 | Benson | 210/241 |
| 4,328,098 | 5/1982 | Benson | 210/241 |
| 5,284,581 | 2/1994 | Benson | 210/194 |
| 5,286,376 | 2/1994 | Benson | 210/194 |

*Primary Examiner*—Robert A. Dawson
*Assistant Examiner*—Robert James Popovics

[57] ABSTRACT

A processing wall is made part of a boundary of a continuous re-entrant lumen, another part of which is a return section. A free, wall conditioning shuttle circulates around this lumen, clearing accumulated material from the processing wall and returning through the return section to circulate again. While the shuttle is in the return section it blocks flow through the return section and while the shuttle is circulating through the processing wall a blocking structure blocks flow through the return section.

3 Claims, 3 Drawing Sheets

PROCESSING APPARATUS WITH WALL CONDITIONING SHUTTLE

CROSS-REFERENCE TO RELATED APPLICATIONS

This application is a continuation-in-part of my U.S. patent application Ser. No. 07/837,487 (filed Feb. 18, 1992), now U.S. Pat. No. 5,286,376 and Ser. No. 07/997,283 (filed Dec. 17, 1992), now U.S. Pat. No. 5,284,581.

BRIEF SUMMARY OF THE INVENTION

This invention relates to processing equipment. In many processing operations critical processing steps take place at a boundary wall of equipment, and in some of these material accumulates at the boundary wall and progressively degrades the efficiency of processing. An example is filtering equipment wherein a fluid initially bearing particulate material passes through a porous wall leaving an accumulation of cake on the wall. This cake then impedes the desired flow of fluid through the porous wall. According to the invention, a processing wall is made part of a boundary of a continuous re-entrant lumen, another part of which is a return section. A free, wall-conditioning shuttle circulates around this lumen, clearing accumulated material from the processing wall and returning through the return section to circulate again. While the shuttle is in the return section it blocks flow through the return section and while the shuttle is circulating through the processing wall a blocking structure blocks flow through the return section.

DETAILED DESCRIPTION

Figure 1:
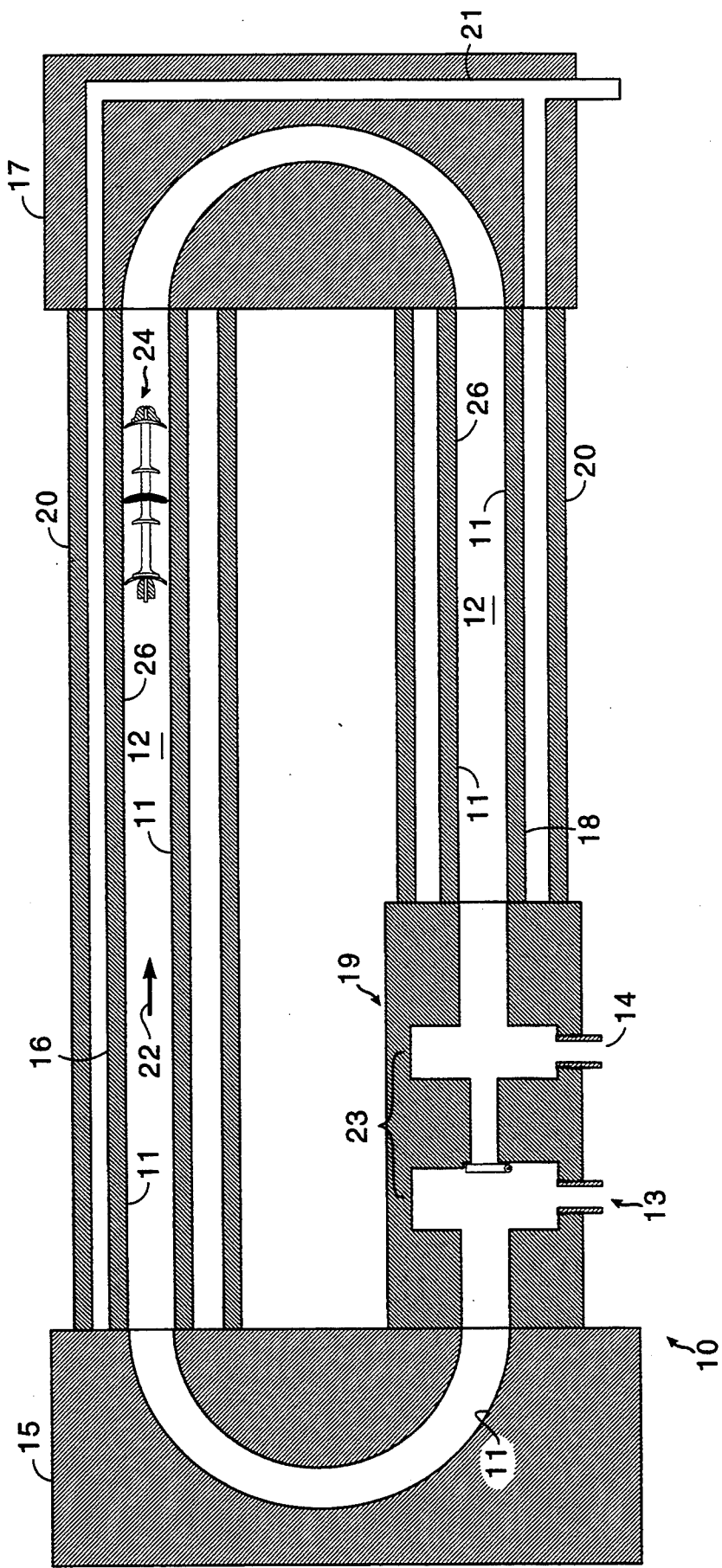
FIG. 1 shows a cross-sectional view of processing apparatus with a wall conditioning shuttle according to the invention.

With reference to the Figures, filtering apparatus 10 according to the invention includes wall 11 which defines continuous re-entrant lumen 12. Entrance port 13 communicates with lumen 12 as does exit port 14. A first, longer path 22 through lumen 12 from entrance port 13 to exit port 14 is defined passing through turning structure 15, upper porous wall tube 16, turning structure 17, and lower porous wall tube 18. A second, shorter path 23 through lumen 12 from entrance port 13 to exit port 14 is also defined passing only through shuttle return section 19. Filtrate containment tubes 20 capture filtrate which passes through processing wall 26, which includes porous wall tubes 16, 18. Discharge channel 21 communicates with the interior of containment tubes 20 and provides for the discharge of filtrate.

Figure 2:
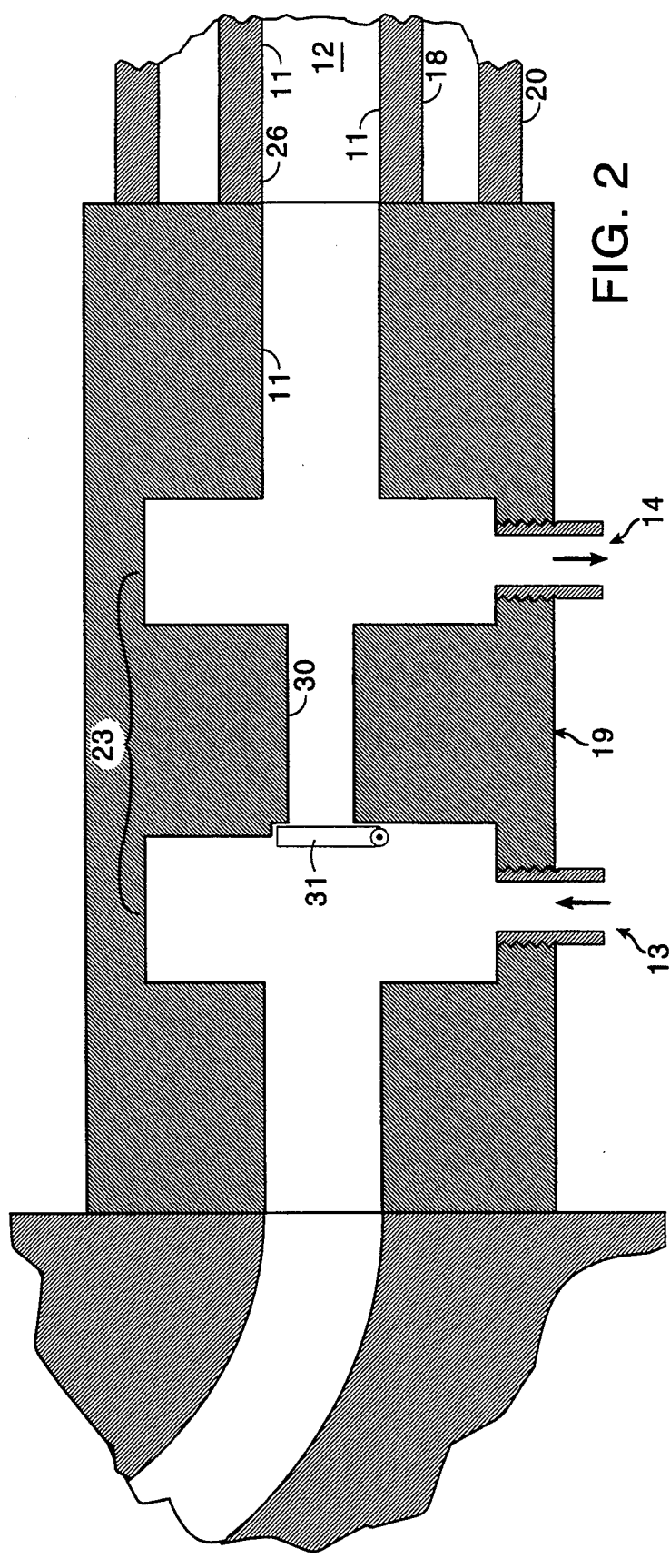
FIG. 2 shows in greater detail the shuttle return section of the apparatus of FIG. 1.

Shuttle return structure 19, as shown particularly in FIG. 2, has a reduced portion 30 in which the cross-section of the lumen is less than in the first path 22, the lumen with the reduced cross-section being in second path 23. The shuttle return structure also includes a plug mechanism such as check valve 31 which blocks flow from entrance port 13 through second path 23 to exit port 14.

Figure 3:
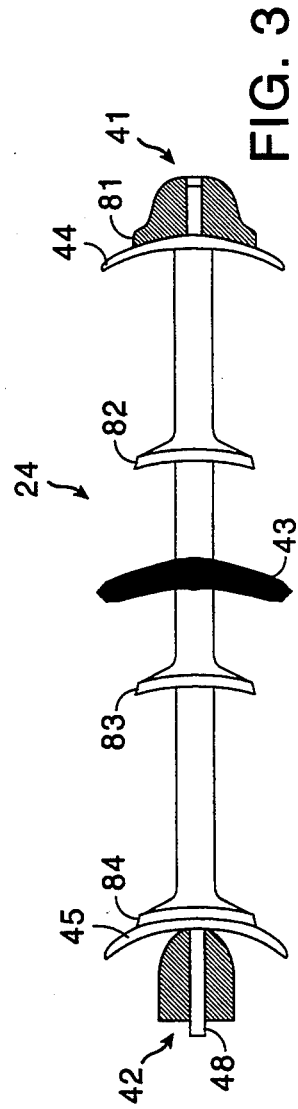
FIG. 3 shows a shuttle used in the processing apparatus of FIG. 1.

Wall conditioning shuttle 24, shown particularly in FIG. 3, is situated within lumen 12 and is free to move independently around the circuit of the lumen. Shuttle 24, has an elongated form extending from lead end 41 to rear end 42 and includes a wall conditioning element such as brush 43, lead entrainment element 44, rear entrainment element 45 and return blocking elements 81, 82, 83, and 84 all affixed on flexible spine 48 running the length of the shuttle.

The distance between lead entrainment element 44 and rear entrainment element 45 is greater than the distance from entrance port 13 to exit port 14 along path 23. Each of the distances between return blocking element 81 and return blocking element 82, between return blocking element 82 and return blocking element 83, and between return blocking element 83 and return blocking element 84 is less than the length of reduced portion 30.

Figure 5:
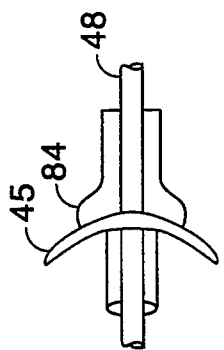
FIG. 5 shows a detail of the construction of the shuttle of FIG. 3.
Figure 4:
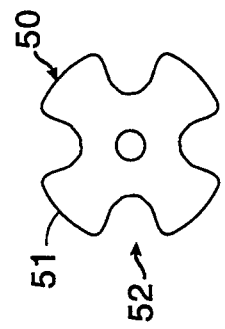
FIG. 4 shows a part used in the construction of the shuttle of FIG. 3.

With reference particularly to FIG. 4, entrainment elements 44, 45 may advantageously be constructed from cut-outs 50 cut from flexing polymeric sheet cut in the form shown in FIG. 4. Two such cut-outs are affixed together centrally with the vanes 51 of one cut-out covering the depressions 52 of the other. This cut out pair is then slipped over spine 48 and clamped against cupped face of return blocking element 84 as shown in FIG. 5. The cupped face presses against the cut-outs and bends the cut-outs backward into a conical shape. The periphery of the associated structure readily accommodates to a smaller radius as the vanes bend backwards and more extensively overlap one another so that the entrainment elements in their expanded form fill the cross-section of the lumen in path 22 while they assume a compressed form fitting within reduced portion 30 when the shuttle passes through path 23.

In operation, fluid in which there are suspended particles is admitted through port 13 and circulates through lumen 12 along path 22. Check valve 31 is closed and prevents flow through path 23. At the same time fluid in the lumen passes through porous walls 16, 18 leaving particles behind on the walls so that fluid free of particles enters filtrate containment tubes 20 from which it is drained through discharge channel 21.

As fluid flows around lumen 12 it sweeps shuttle 24 along with it. As the shuttle moves through the porous wall tubing the wall conditioning elements 43 clear accumulated particles from the wall surface so that the pores of the wall do now become blocked.

When the shuttle is swept into the return structure 19, lead entrainment element 44 passes across exit port 14 and enters reduced portion 30, deforming to assume a smaller periphery as it does so. Then the lead end of the shuttle element continues to advance, pushing open check valve 31, passing across entrance portion 13 and enters path 22 of the lumen. It may be noted that lead entrainment element 44 enters the upstream end of path 22 before rear entrainment element 45 has left the downstream end of path 22 so that at least one of these entrainment elements is always in path 22 where the flow will sweep it along. It may also be noted that while the shuttle holds check valve 31 open there is always at least one return blocking element in reduced portion 30 so that a short circuit of flow from entrance port 13 through reduced portion 23 to exit port 14 is prevented. After the shuttle has passed through return section 19 it is swept by the flow through another circuit of lumen 12 where it again clears the wall of accumulated particles.

It will be understood that the invention can be employed to filter a great variety of particle bearing fluids by suitable design of the porous wall and the wall conditioning elements. The invention can also be employed in circumstances where solids are generated at the processing wall and it is desirable to clear the wall.

Figure 7:
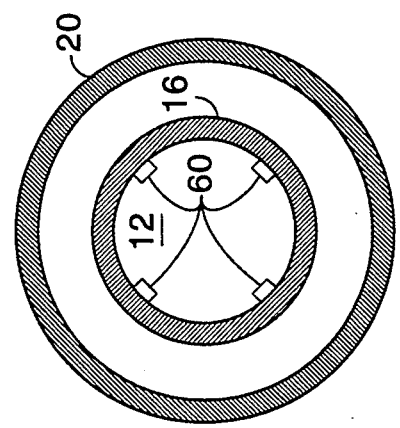
FIGS. 6 and 7 show details of an alternative construction of processing apparatus according to the invention.
Figure 6:
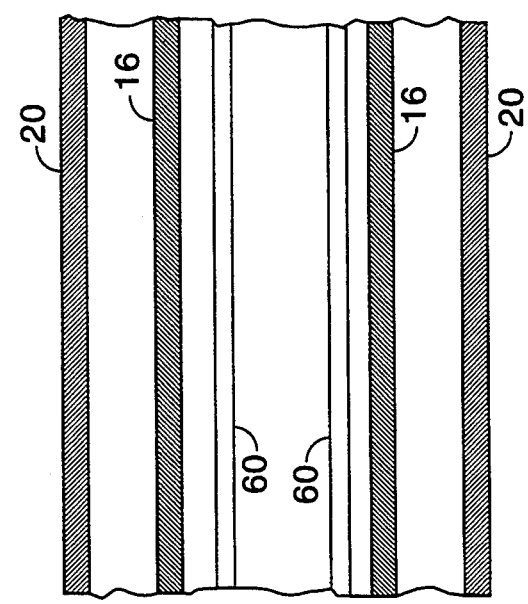

An adaptation particularly advantageous when a delicate processing wall is required is shown in FIGS. 6 and 7. Lands 60 extending the length of the processing wall are affixed to the processing wall and protrude a short distance into the lumen. As the shuttle passes through the lumen the entrainment elements then ride on the lands so that abrasion the porous surface is avoided.

I claim:

1. Processing apparatus comprising structure defining a continuous re-entrant lumen, said lumen having a wall, an entrance port communicating with said lumen and an exit port communicating with said lumen, said ports being disposed asymmetrically around a circuit of the lumen so that a first path and a second path from the entrance port to the exit port through the lumen are defined, said first path being longer than said second path, a shuttle return structure situated around said second path, processing wall on which material accumulates during operation of said apparatus, said processing wall being part of said lumen wall and situated along said first path, a shuttle elongated in form with a lead end and a rear end, said shuttle having a length between said lead and rear ends less than a length of a circuit through the lumen, said shuttle being situated within the lumen and unconnected to any other structure and free to move through the lumen, said shuttle comprising a wall conditioning element effective when the shuttle passes through said first path to clear accumulated material from said lumen wall, a plug mechanism effective in blocking flow from said entrance port to said exit port through said second path.

2. Apparatus as claimed in claim 1, wherein said shuttle return structure comprises a reduced portion in which said lumen has a cross section smaller than said lumen has in said first path.

3. Apparatus as claimed in claim 1, comprising lands affixed to said processing wall and protruding into said lumen.

* * * * *